United States Patent
Perkins et al.

(10) Patent No.: US 10,006,778 B2
(45) Date of Patent: Jun. 26, 2018

(54) METHOD AND APPARATUS FOR VEHICULAR TRAVEL ASSISTANCE

(71) Applicant: FORD GLOBAL TECHNOLOGIES, LLC, Dearborn, MI (US)

(72) Inventors: William Paul Perkins, Dearborn, MI (US); Kenneth James Miller, Canton, MI (US); David B. Kelley, Ottawa Hills, OH (US); Jimmy Kapadia, Ottawa Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/349,372

(22) Filed: Nov. 11, 2016

(65) Prior Publication Data

US 2018/0136003 A1    May 17, 2018

(51) Int. Cl.
*G01C 21/26* (2006.01)
*G01C 21/34* (2006.01)
*G01C 21/36* (2006.01)

(52) U.S. Cl.
CPC ..... *G01C 21/3655* (2013.01); *G01C 21/3469* (2013.01); *G01C 21/3492* (2013.01); *G01C 21/362* (2013.01); *G01C 21/3691* (2013.01)

(58) Field of Classification Search
CPC ........ G01C 21/00; G01C 21/26; G01C 21/32; G01C 21/34; G08G 1/00; G08G 1/16
See application file for complete search history.

(56) References Cited

U.S. PATENT DOCUMENTS

| | | | |
|---|---|---|---|
| 8,392,116 B2 | 3/2013 | Lehmann et al. | |
| 9,212,925 B2 | 12/2015 | Bell et al. | |
| 2007/0159355 A1* | 7/2007 | Kelly | G01C 21/3694 340/905 |
| 2010/0241342 A1* | 9/2010 | Scalf | G01C 21/3492 701/117 |
| 2010/0268456 A1* | 10/2010 | Kantarjiev | G08G 1/0112 701/465 |
| 2013/0079964 A1 | 3/2013 | Sukkarie et al. | |
| 2013/0173153 A1* | 7/2013 | Hayashida | G08G 1/0112 701/527 |
| 2014/0172292 A1 | 6/2014 | McGee et al. | |

* cited by examiner

*Primary Examiner* — Yonel Beaulieu
(74) *Attorney, Agent, or Firm* — Jennifer Stec; Brooks Kushman P.C.

(57) ABSTRACT

A system includes a processor programmed to send first and second recommended routes to a wireless device in response receiving a present vehicle location stored when the vehicle was parked and also a received destination and departure time. The first recommended route is based on travel-time factors corresponding to the destination and departure time and specified routing and timing preferences. The second recommended route is based on a calculated alternative departure time using the specified preferences.

20 Claims, 7 Drawing Sheets

METHOD AND APPARATUS FOR VEHICULAR TRAVEL ASSISTANCE

TECHNICAL FIELD

The illustrative embodiments generally relate to a method and apparatus for vehicular travel assistance.

BACKGROUND

Many sources for current weather and traffic information are available to drivers for use in planning routes to avoid congestion or other delays. However, drivers may not remember to consider possible delays until a journey is underway. Planning in advance may help mitigate delays, but compiling available traffic and weather information can be a complicated task. Additionally, predicted traffic or weather situations may change prior to a planned departure thereby reducing the usefulness of advanced planning.

Another consideration is the time and effort involved in detailed route planning. Drivers do not typically have an entire afternoon to track traffic patterns, track weather fronts and modify planned routes to a destination. Drivers may not even be able to find and/or access all the resources needed to plan routes in this manner. If drivers can access all of these resources, it is a fairly unrealistic proposition to expect that people will spend a few hours each day planning the optimal version of a twenty or thirty minute commute.

A few decades ago, a driver would access a paper map, determine a route to a destination, and utilize any local knowledge and weather reports to optimize the route, if possible. Changes in weather and traffic encountered along the route would simply be accommodated in stride. Nowadays, navigation systems can help identify routes, road closures and traffic backups. But traffic has a historic component and is also subject to instantaneous changes. Similarly, weather reports are somewhat unreliable and their projected effect on a route may vary as a day progresses and weather patterns change. While there is a great deal more information available to optimize routes, the disconnected and dynamic nature of the data presents new problems with respect to access and effect-determination, respectively.

SUMMARY

In a first illustrative embodiment, a system includes a processor programmed to send first and second recommended routes to a wireless device in response receiving a present vehicle location stored when the vehicle was parked and also a received destination and departure time. The first recommended route is based on travel-time factors corresponding to the destination and departure time and specified routing and timing preferences. The second recommended route is based on a calculated alternative departure time using the specified preferences.

In a second illustrative embodiment, a computer-implemented method includes calculating a projected travel time for a driver-selected route to a destination, responsive to definition of the destination and a preferred departure time. The method includes calculating at predefined time intervals between a present time and the preferred departure time. The method also includes recommending an alternative departure time, calculated to result in a shorter travel time to the destination, responsive to the calculated projected travel time increasing by more than a predetermined threshold over an initial projected travel time.

In a third illustrative embodiment, a system includes a processor configured to wirelessly receive, from a vehicle, a plurality of recommended departure times and corresponding projected travel times to a destination confirmed by a user. The processor is also configured to display the recommended departure times and corresponding projected travel times in a user-selectable manner. The processor is further configured to receive selection of a recommended departure time as a preferred departure time and transmit the selected recommended departure time to the vehicle.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
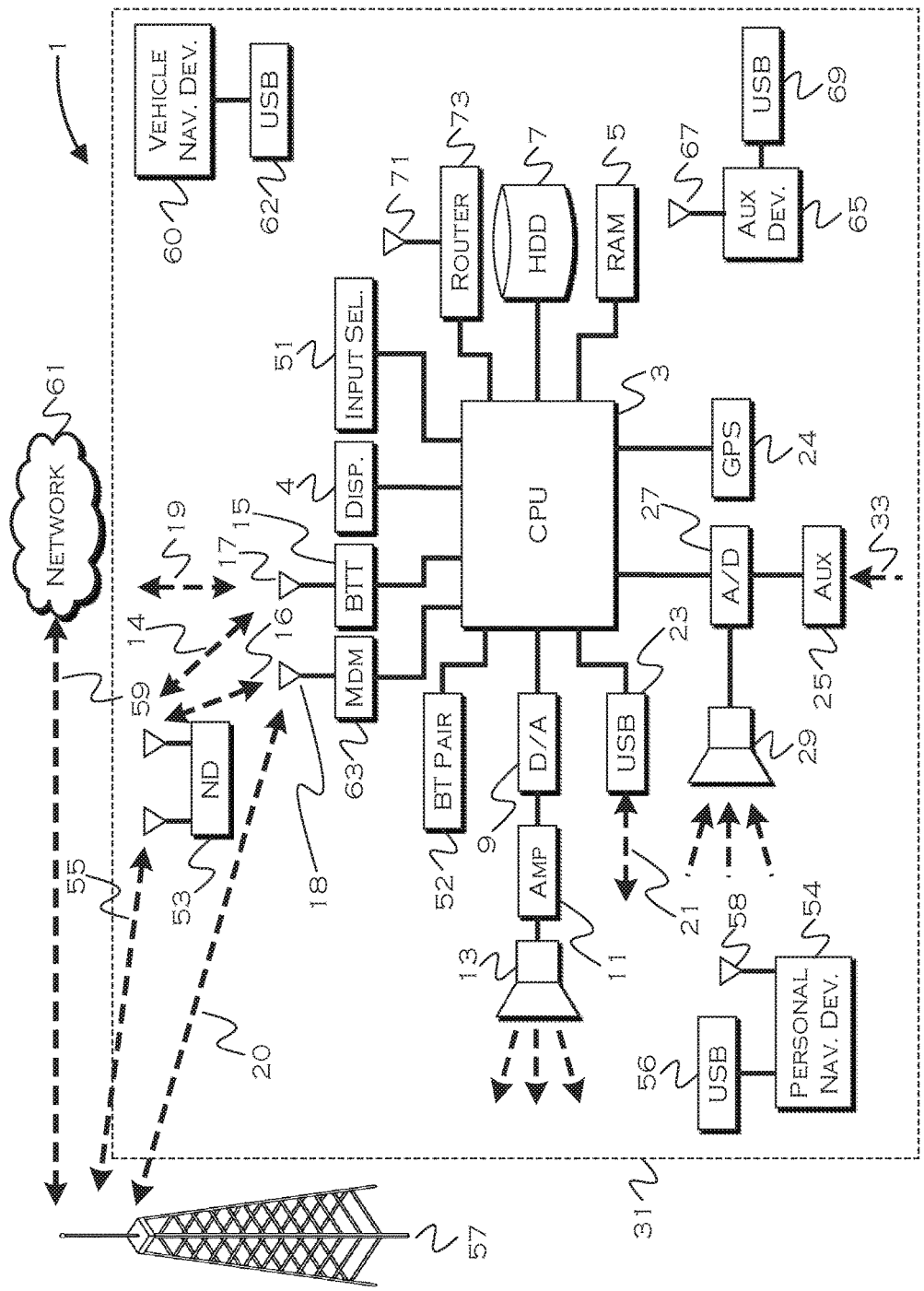
FIG. 1 illustrates a representative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs of the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WI-FI access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WI-FI and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WI-FI) or a WiMax network.

In one embodiment, incoming data can be passed through the nomadic device via a data-over-voice or data plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but is not limited to, personal media players, wireless health devices, portable computers, and the like.

Also, or alternatively, the CPU could be connected to a vehicle based wireless router 73, using for example a WI-FI (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Upon entering a vehicle, a driver often utilizes a smart phone or other wireless device to launch an application with the intent of checking traffic congestion and trying to find the best route to a destination. Such action can provide detailed current traffic information and a current optimal route based on specified criteria, which may be user selectable and/or may change based on the particular application and implementation. Unfortunately, since the driver is already in the vehicle, if there are no suitable routes to satisfy the driver, the driver is left with the choice to either leave the vehicle and depart at a later time or take a heavily congested route to a destination. Had the driver known that the departure time was sub-optimal based on the driver's route criteria, the driver could have planned an earlier or later departure, for example.

The driver could have attempted to determine better departure time information prior to leaving, but that would have required a research time investment with the interest of saving time on the commute. Any research done by the driver would also be marginalized because of the delay and change in conditions between checking the information and actually entering the vehicle to begin the trip.

The illustrative embodiments present methods and systems that actively monitor routes and delays, and which can alert a driver to optimal departure times and recommended routing well in advance of a planned departure. Even though these methods and systems may be subject to some degree of imperfection due to unexpected changes in conditions, the ability of the illustrative embodiments to integrate historical and currently changing conditions on an ongoing basis allows for a far more accurate and simple analysis of an upcoming journey than were the driver to attempt to accomplish such a consideration manually.

In the illustrative examples, a vehicle route-planning computer and/or a cloud-based system interacts with the driver's smart device (phone, iPad, watch, etc.) to prepare the driver and vehicle for a near-term trip.

The vehicle can use cloud communication to interact with the driver's smart device and relay relevant trip-related information (departure times, traffic, routes, etc.). Through sustained computing, the vehicle can continue processing data and interacting with the driver at any time of the day, even though other vehicle systems may be powered down. Through deep-learning algorithms, the vehicle's onboard computer (working alone or in conjunction with cloud-based systems) can analyze driving data and adapt to usage patterns to predict departure times and destinations even in the absence of explicitly specified information.

These and similar processes allow a vehicle to initiate a route analysis process based on, for example, a driver's indication that the driver will soon need to use the car, or a deduced probability that the driver will soon use the car based on prior usage patterns (deep learning about usage times/days, destinations, etc.).

In the first scenario, the driver may or may not specify a destination. If the destination is not specified, or in the second predicted-usage scenario above, the vehicle may determine a high-probability destination based on prior usage. With a destination, the vehicle can evaluate traffic congestion and other factors (weather, events, etc.) to find the most optimal routes depending on departure times and communicate this information to the driver.

The vehicle can also similarly determine a departure time for a trip to a destination based on specified or default criteria, and can convey projected trip duration(s), delays, recommended departure times and other relevant information to the driver. The driver, who still may not have yet departed, may see the information displayed on a wireless device, confirm the destination, choose a departure time, and possibly select other related options so that the vehicle can prepare for the trip (e.g., preconditioning before expected departure). The vehicle can then continue to monitor the chosen route and departure time in case unexpected delays or traffic clear-ups result in a route or recommended departure time that better matches the specified criteria.

For example, a driver typically leaving work at 5:00 PM may experience a journey of approximately 40 minutes to his destination. If the driver leaves work at 5:30 PM, the duration of the journey may decrease to 25 minutes. Thus, leaving at 5:00 the driver arrives at home at 5:40, while leaving at 5:30 the driver arrives at home only 15 minutes later at 5:55. The driver may learn this generalized knowledge through experience, although the travel times are subject to any number of variations on a given day. Personal experience thus provides only a rough approximation of travel conditions and travel time.

Using the illustrative embodiments, at 3:00 PM the driver could be told of predicted traffic delays (for construction or large accidents), predicted weather delays and any other historic or present information that may affect the projected travel time. The driver could also be presented with predicted travel times at a number of additional departure times. These additional departure times may serve to inform the driver of a better departure time (e.g, 4:45 PM) that the driver had never even considered or for which the driver had very limited personal knowledge of historical conditions.

From the presented options, the driver can select (or modify) a preferred departure time and route, or specified arrival time or route avoidance, weather avoidance, etc. and the vehicle can continue to monitor the parameters that may impact the specified criteria, such as the route and departure time, in case unexpected or unpredicted changes to conditions make the departure time or route sub-optimal. This allows the driver to adapt behavior to meet desired driver criteria through a few device interactions, as opposed to the driver having to do expansive daily research and guesswork.

Figure 2:
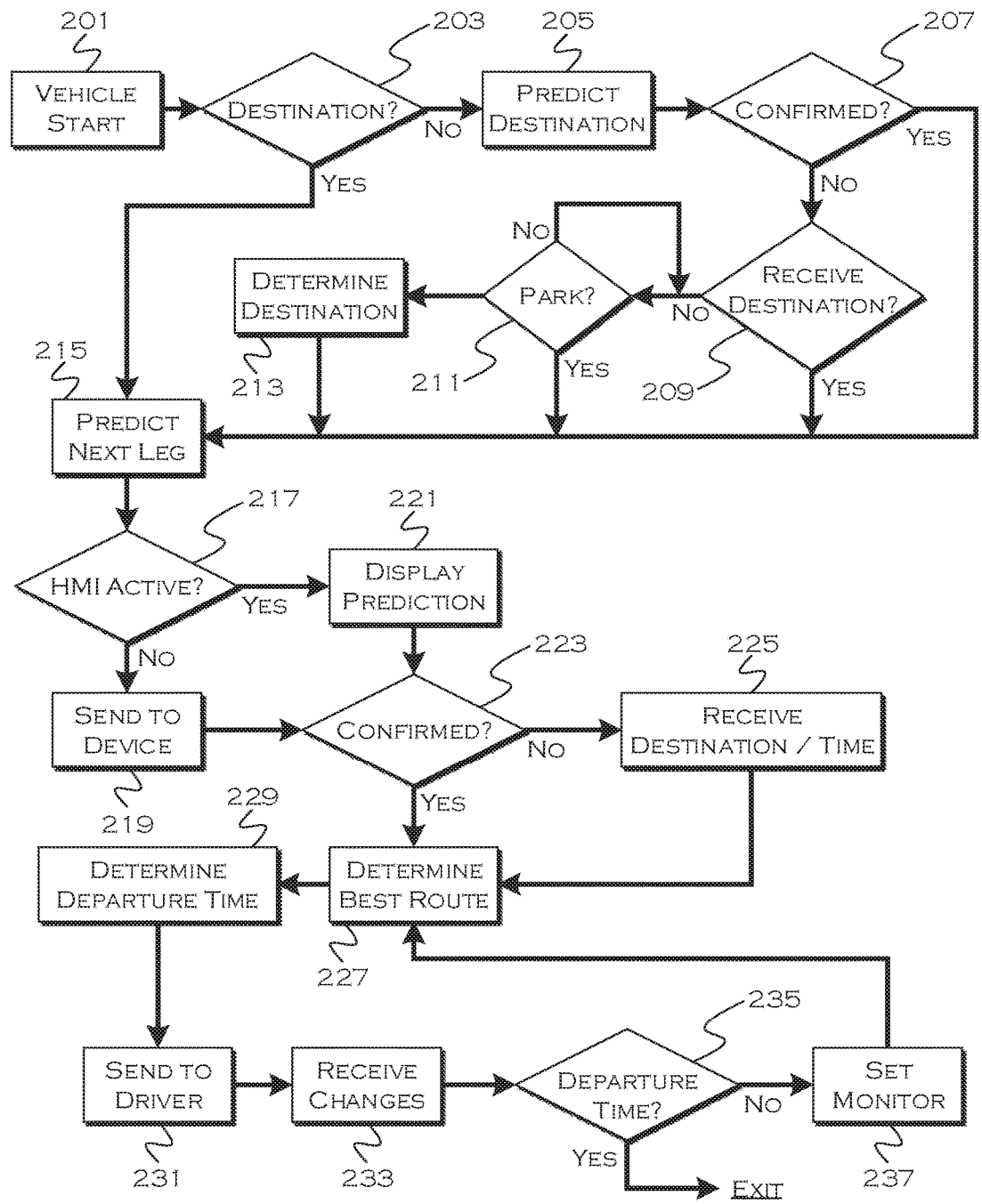
FIG. 2 illustrates a representative process for destination determination and departure assistance.

FIG. 2 illustrates a representative process for destination determination and departure assistance. While many of the illustrative processes are shown as being performed by the vehicle computer, it is also possible that a cloud-based system or another computing device (such as a driver wireless device) can perform some or all processes or sub-routines. In at least one example, the vehicle may request data relating to travel determinations from the cloud, and the cloud can respond to the request by either providing the data or performing the calculations if sufficient computing cycles are available on the cloud for the cloud to simply process the determination. This system of alternative solution-providing options can accommodate high-volume request times, leveraging the vehicle when the cloud would be overwhelmed (such as during rush hour) and leveraging the cloud when there are a limited number of incoming requests. Accordingly, if such an adaptive system is implemented, the destination and departure time data (if known by the vehicle) can accompany any request to the cloud for data so that the cloud can simply utilize the departure time and destination data to complete the determination instead, if appropriate.

Communication between the vehicle/cloud and driver device can be similarly managed, depending on costs and other considerations. In some instances, the vehicle may receive the data and convey relevant information directly (through a cellular connection, for example) to the driver device. In other instances the cloud may act as an intermediary. In the preceding example, when the cloud is acting as an intermediary, a cloud system is directly conveying information to the driver device without explicit vehicle instruction (i.e., it is a source of the information rather than a mere relay for the information from the vehicle).

In the example shown in FIG. 2, the process begins when a first vehicle journey starts, marked by the start of a vehicle 201. The process determines if a current destination (for the current journey) is known 203, since that information may be relevant to a determination as to a future destination. If the vehicle does not know the destination for the current journey, the vehicle may attempt to predict the destination 205 based on time-of-day, departure location, and other factors useful in destination predictions based on previously observed driver behavior.

Also, in this example, the vehicle attempts to confirm the predicted destination 207, and if the vehicle is incorrect, the vehicle can instead receive the destination input 209 by an occupant. If the occupant is too busy to input the destination or otherwise does not wish to input the destination, the process waits until the vehicle is in park 211 to determine the destination 213. At this point, the destination is assumed to be the location where the vehicle was placed in park.

Once the vehicle knows the destination of the present journey, the vehicle can begin to determine predictions about a next leg of a journey 215 (such as when and to where). The vehicle can base these predictions on historically observed behavior and other relevant factors (time of day, day of week, etc).

As an example of the first part of this process, if the driver is leaving home on a Monday morning the vehicle may either be told (through input) or guess (based on historic behavior) that a driver is headed to work. The work destination location may be known, and if the driver does not input or confirm this destination, then at the latest the vehicle knows this destination when the driver arrives at work (i.e., at the destination). Once the vehicle destination of "work" is known, the vehicle can predict that the driver will depart work at 5:00 PM (based on historic behavior) and drive home (the next leg destination, also based on historic behavior). Different starting locations, current trip destinations, times of day and days of week, among other things, may result in different predictions based on what the vehicle has learned about driver behavior from historic observation.

Next, in the illustrative process, if the vehicle human machine interface (HMI) is still active 217 (that is, if the vehicle has not been powered down and the interface disabled), the process displays the predicted destination 221 for the next-leg, along with the predicted departure time. This allows the driver to confirm the upcoming trip and time, and to accommodate any particular changes for a given day (e.g., the driver is leaving early, staying late or headed elsewhere after work).

If the HMI is inactive, the driver may not still be in the vehicle, so the vehicle may instead send the confirmation information to a driver wireless device 219. Once the driver has adjusted and/or confirmed the departure time and destination 223, the route/departure improvement portion of the process can begin. If the driver wishes to change the information, the driver can input a new departure time and/or destination 225, which the vehicle can use to both improve the route/departure time and update historically observed behavior (for use in future predictions).

Based on the intended destination and departure time, both of which are now known by the vehicle, the vehicle can determine a best route 227 based on predicted traffic and weather delays (and any other factor that may impact travel time based on current trip planning or routing criteria). Other factors can be many. For example, if the driver utilizes a ferry in a commute, ferry departure times and arrival times at the ferry location could significantly impact total travel time (if the driver arrived just after the ferry left, for example). In such an example, the system can target an arrival at the docks prior to ferry departure to optimize travel time, and/or consider the impact of ferry availability when determining departure and travel times.

The vehicle can also determine a best departure time. This can be partially based on preconfigured driver preferences. One driver may prefer to arrive home as early as possible, another driver may prefer to minimize travel delays. The vehicle may also consider vehicle fuel/power conditions, since insufficient fuel/power for certain routes or travel durations may remain. The vehicle can determine a departure time corresponding to driver preferences 229 or other preset conditions.

The vehicle can then send the recommended route and departure time to a driver wireless device 231. If the driver agrees to a new departure time and to the route, or wishes to make any changes 233, the vehicle receives the response for utilization in monitoring the expected route and departure time. In this example, if it is not yet the departure time 235, the process sets monitoring 237 for the expected route and time, and continues to monitor the route for any useful informational changes (unexpected traffic changes, weather changes, road closings, etc.).

Once the departure time is less than a threshold time away, the vehicle can also precondition. This includes, for example, warming up an engine, changing climate controls, presetting radio stations and making any other predefined accommodations to improve the travel experience and/or facilitate vehicle operation or efficiency.

Figure 3:
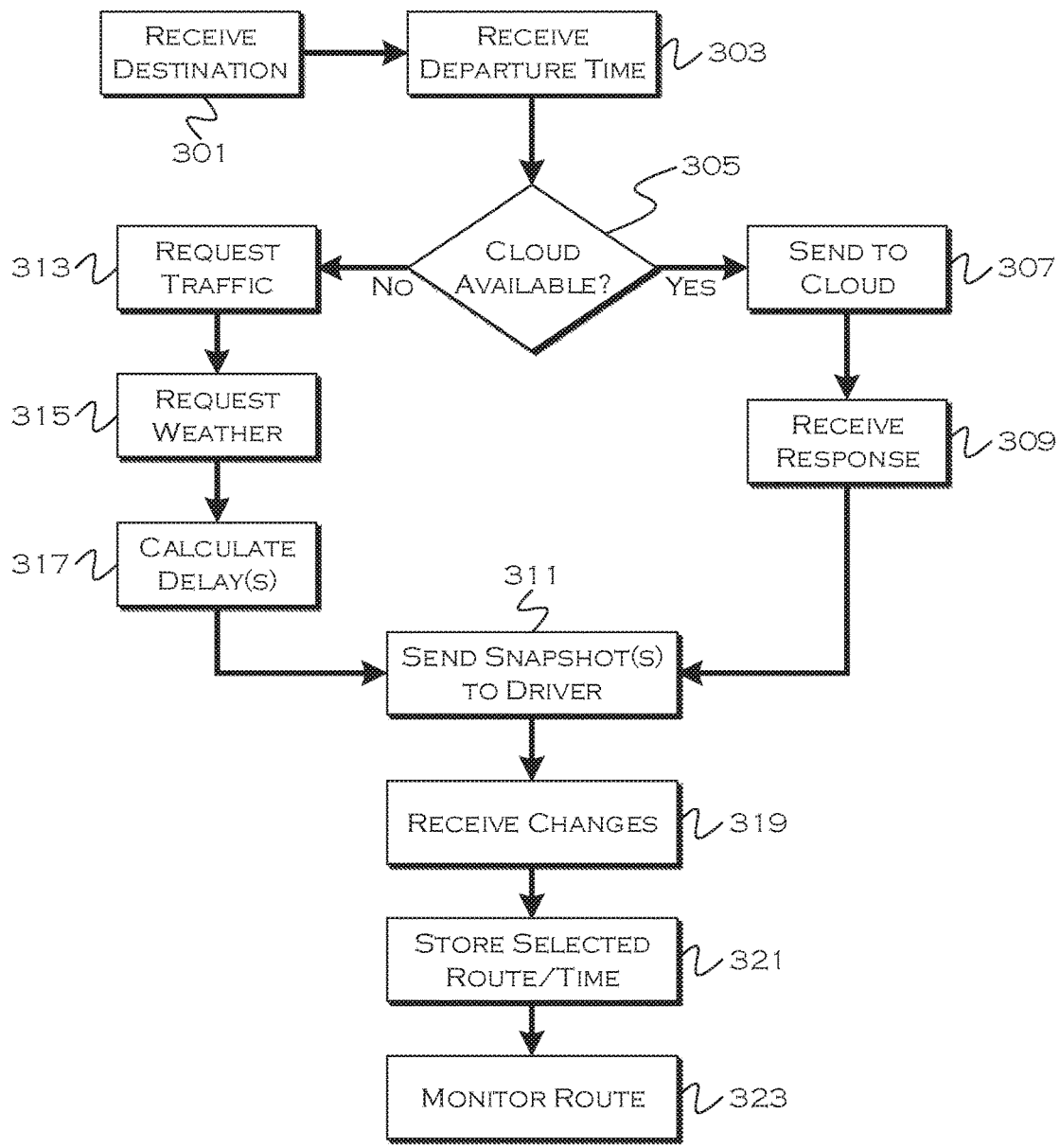
FIG. 3 illustrates a representative process for route and departure time improvement.

FIG. 3 illustrates a representative process for route and departure time improvement. In this example, the vehicle receives a confirmed destination 301 and departure time 303. This represents a destination and time which the vehicle could have predicted and had confirmed or the driver could have explicitly input.

This example demonstrates the ability of the systems to adaptively utilize remote computing power depending on availability. In this example, the vehicle sends a request to the cloud to determine if the cloud has sufficient computing cycles to handle the routing improvement consideration. If the cloud is available 305, the vehicle sends the destination and departure time data (and any other useful data) to the cloud 307 for processing. The cloud then performs the optimization considerations and, in this example, sends the data back to the vehicle 309. In an alternative example, the cloud could send the processed data directly to the driver.

If the cloud is not available (which may be the case during rush hour, for example), the vehicle requests historic and current (if relevant) traffic 313 and weather 315 data. Any other travel-time impacting data could also be requested at this time. The vehicle can store this data locally and use the data for future route considerations, updating the data periodically to accommodate for changes in historic observations. If the vehicle is making the determinations relating to travel time and delays well in advance of a journey (e.g., eight hours ahead of time), the current traffic and weather data may not be particularly useful. On the other hand, as the departure time nears, this data becomes more and more useful to the determinations. The vehicle can request the particular types of data based on predefined relevance, so that the vehicle may request different data based on temporal proximity to departure.

Once the vehicle receives the relevant data, the vehicle will predict any estimated delays for a trip to a given destination. This can include evaluating multiple routes at multiple departure times, accommodating for both historic and present traffic and present weather and weather reports, among other things. The data can be compiled in many forms, and the vehicle sends one or more snapshots of the determined data to a driver wireless device.

In one example, the data is compiled in a manner similar to weather-in-motion maps commonly available on websites such as WEATHER.COM. Instead of showing weather patterns, however, these snapshots show predicted traffic changes and recommended routes at fixed intervals. So, for example, if an intended departure time was 5:00 PM, the snapshots might accommodate 15 minute intervals for an hour before and after 5:00 PM. This allows the driver to quickly flip through the screens corresponding to the changing conditions and visually interpret the predicted changes in travel times, traffic and arrival times. In other examples, the system can send data as simple as a confirmation of departure time and/or route, or a recommendation of a new route or departure time. An example of the varied-map display is shown with respect to FIG. 6.

If the driver agrees to any recommendations or makes any changes to the intended route or departure time, the vehicle receives these changes from the driver wireless device 319. The vehicle may store any changed route or time as the new route and/or time 321 and monitoring can then continue for the new or persisting route/time 323.

Figure 4:
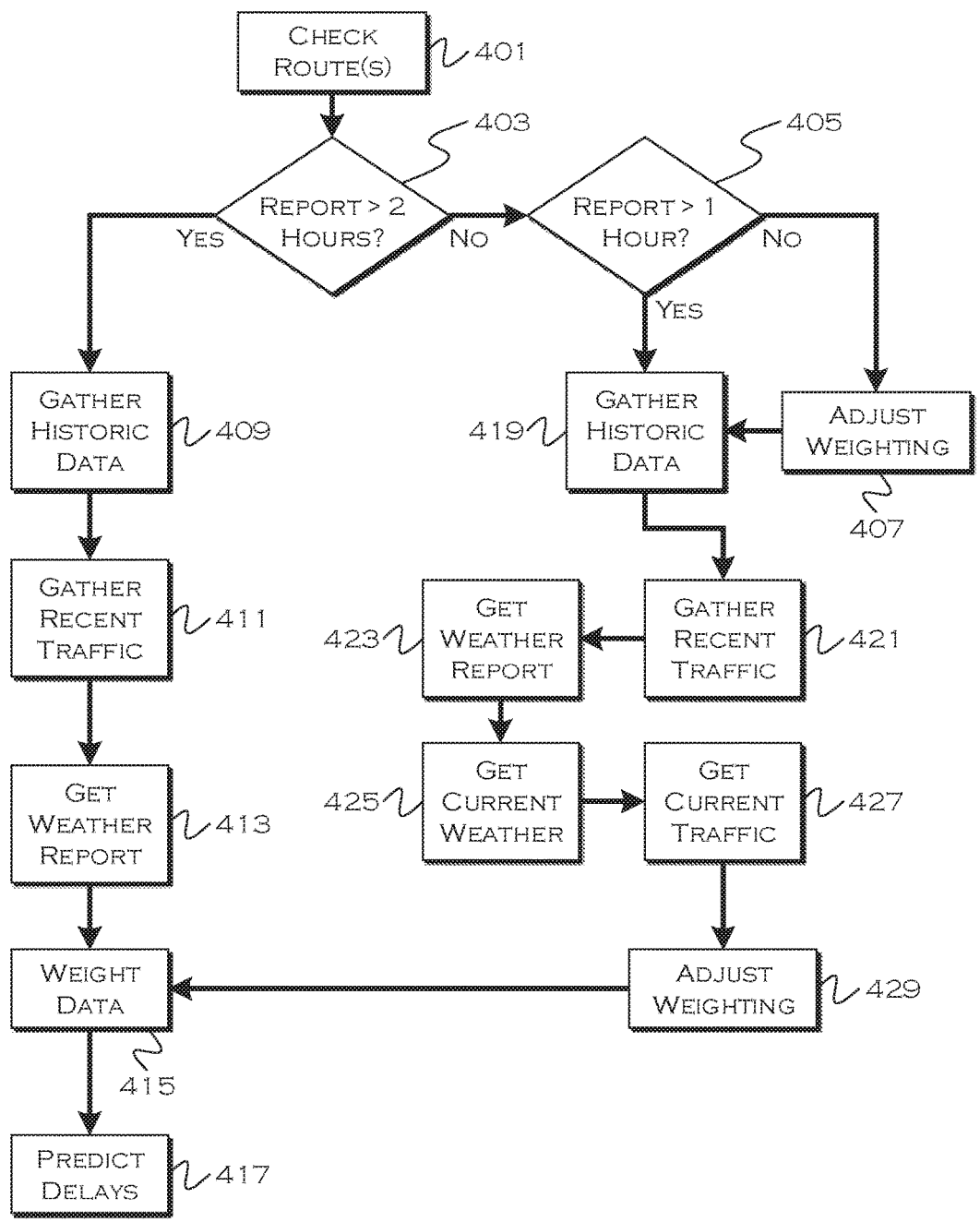
FIG. 4 illustrates a representative process for route and departure time evaluation.

FIG. 4 shows an illustrative process for route and departure time evaluation. In this example, the process considers different illustrative information based on how temporally proximate the departure time is. The particular information considered is shown for illustrative purposes only, additional or different travel-time-affecting information may also be considered.

The vehicle knows the departure time and destination in this example, and first determines one or more routes to a destination. For example, the vehicle may first perform delay-affecting determinations with respect to a currently-intended route. If no unexpected delays are found, then the system may only consider one or two (or no other) additional routes. If the expected travel time has changed beyond a threshold, however, the system may consider more alternative routes, to accommodate the unexpected delay.

In this example, if the temporal proximity of the departure time is more than two hours 403 (specific time windows provided as illustrative examples only), the process relies heavily on historic data in this example. This is because the current weather and traffic data is probably less useful at such a time ahead of expected departure. The time the vehicle utilizes for "departure time" can also be treated as the first instance of the snapshot windows (which can be in advance of the departure time) if the snapshotting or similar methods are employed.

The vehicle gathers (or accesses, if already stored) historic traffic data for the route 409 as well as recent traffic patterns 411. Thus, the vehicle may have two different sets of traffic data, one representing a few months or years of travel data and another representing the most recent week of travel data. Instances such as construction, and the like, may only be recent in time and are more likely to be reflected in a close-in-time view of data as opposed to a longer historical view. The vehicle also gathers a weather report for the relevant time window 413. Historic weather data may be less useful unless the area climate is very consistent In this example the vehicle uses a weather report instead of historic weather data to predict upcoming conditions.

The vehicle also weights the data 415, and the weighting can vary based on temporal proximity to departure. For example, if the vehicle did consider current traffic conditions during this determination (more than two hours from departure), the vehicle may weight that data very low due to its likelihood of change. On the other hand, fifteen minutes before departure, the vehicle may weight the current traffic data much higher than historic data, as the current data is much more likely to provide accurate present conditions in fifteen minutes. Once the vehicle has weighted the considered data, the vehicle determines any likely delays associated with a route 417.

If the departure time is less than one hour away (but no more than two hours) 405, the vehicle again gathers historic traffic data 419 and 421, as well as a weather report 423. Again, the specific timing is provided for illustrative purposes only. Since the departure is more imminent in this instance, the vehicle also gathers current weather 425 and current traffic conditions 427. While these may have been used by the further-out determination, if desired, the relevance of this data increases as the departure time approaches. Accordingly, the vehicle may adjust the weighting 429 based on the intermediate time window, prior to assigning weights to the data.

A similar process occurs each time the time window shrinks, with the example of departure being less than an hour away being shown. The vehicle can adjust the data weighting 407 to accommodate the upcoming departure, and the vehicle can make this adjustment as many times as needed as the departure approaches. The vehicle may also consider additional relevant data whose relevance increases with proximity to departure time in closer and closer windows to departure.

Any of the vehicle-based processes that occur involving computing by or communication with the vehicle, can occur even if the vehicle is not otherwise powered. That is, even if a key is not present and the ignition is not "on," the vehicle can wake or otherwise execute the route related processes described herein. This allows for leveraging of the vehicle computing power even though the vehicle is not explicitly powered by an occupant in the vehicle.

Figure 5:
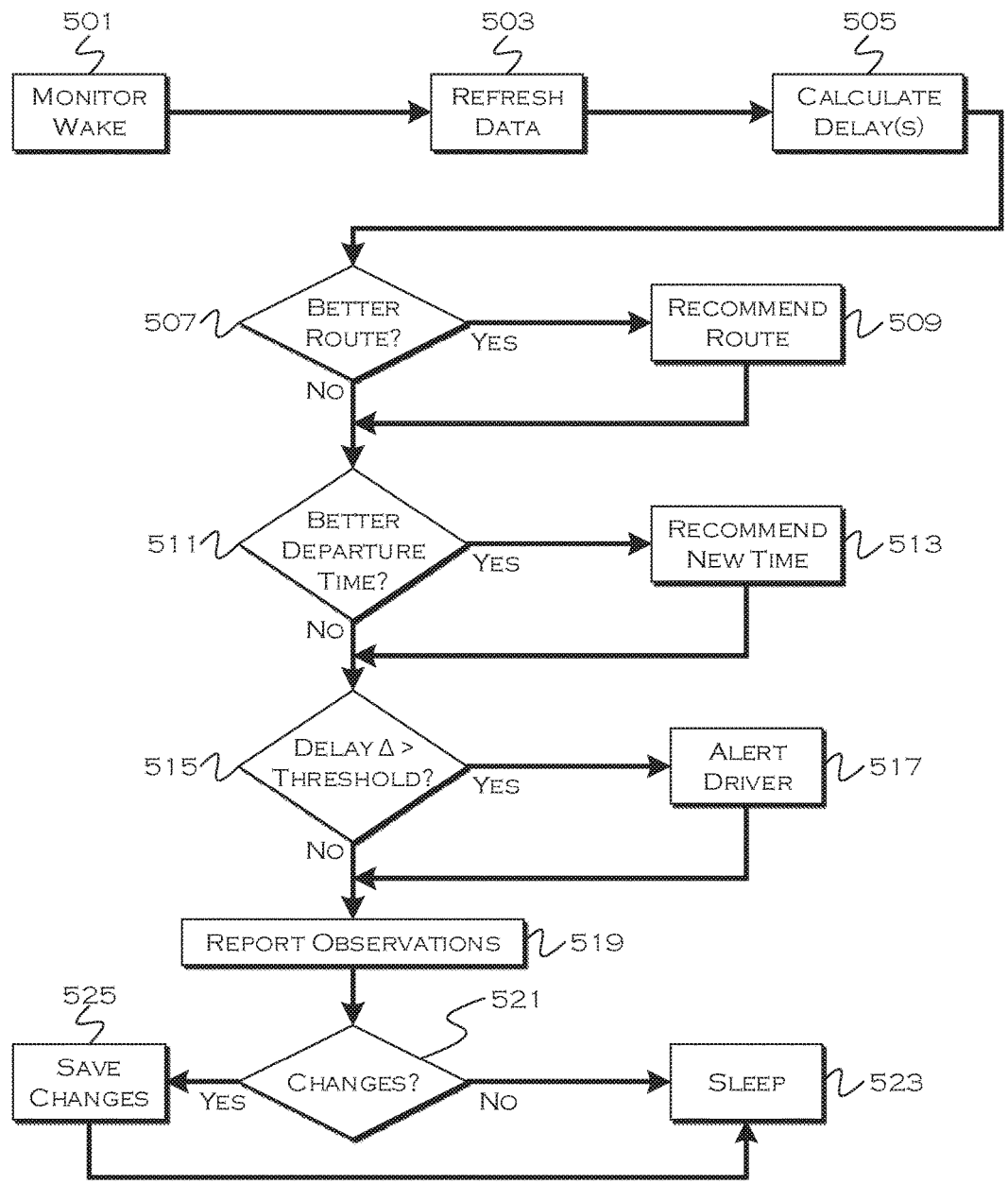
FIG. 5 illustrates a representative process for route and departure time monitoring.

FIG. 5 shows an illustrative process for route and departure time monitoring. This process enables the vehicle to monitor the selected route and departure time and inform the user of any changes that might make a different route or departure time a better choice.

The vehicle process wakes 501, possibly at predefined intervals, even though the vehicle is generally unpowered. The vehicle communicates with the cloud to refresh 503 any data that needs to be updated for the new consideration. The vehicle may already have saved historical traffic data for the route, but the vehicle may need to refresh a weather report or current traffic conditions, for example. The vehicle then calculates any delays associated with the chosen route and departure time 505, based on the saved and newly received data. The vehicle also considers one or more alternative routes, based on the data obtained, to determine if a better route exists.

If a better route exists (faster or other relevant changes based on driver optimization preferences) 507, the vehicle records a recommendation for the better route 509. The vehicle does not yet send the route, in this example, because the vehicle considers other travel-time affecting considerations before sending the recommendations. In other examples, the recommendations can be sent iteratively, and the determination can continue once the user has accepted or declined the updated recommendations.

If there is a better departure time based on the trip criteria and related parameters for the selected or recommended route 511, the process will include a recommendation for a new departure time 513. The better time can be based on diminished traffic, improved weather, improved overall travel time, improved arrival time, etc. The better departure time can also result in an altered route recommendation, the new route having characteristics based on the driver preferences (shorter distance, shorter time, less fuel, etc.).

Also, in this example, if any delay with a previously chosen route exceeds a threshold 515, the vehicle adds a notification of the unexpected delay 517 to a message. The route and departure time may still be optimal, but the driver may want to know in advance of the delay, so the driver can change any plans accordingly. This helps avoid unexpected surprises when the driver actually departs.

The vehicle then reports any observations to the driver wireless device. These can include, but are not limited to, recommended changes in route or departure time, unexpected delays, or even just an update to say that all conditions persist as previously predicted. If the vehicle makes any recommendations that the driver accepts, or if the driver makes any voluntary changes to the route or departure time 521, the process receives and saves the new changes 525. Then the process returns to a sleep-state 527 until the next monitoring window.

Figure 6:
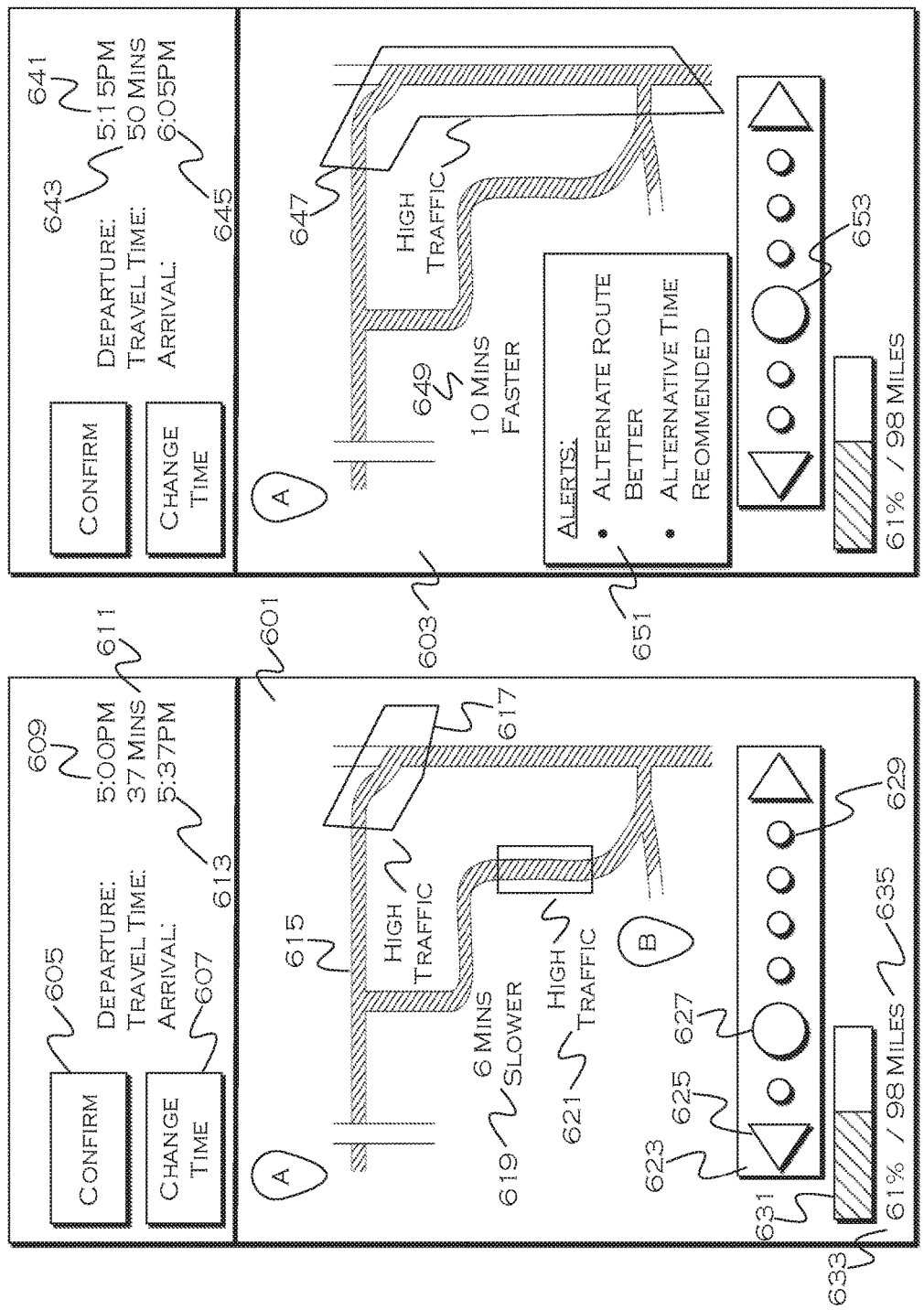
FIG. 6 illustrates representative route recommendation displays.

FIG. 6 illustrates two illustrative route recommendation displays. This is an example of snapshotting the predicted route travel time and traffic in time intervals preceding and following a selected or recommended departure time. This provides a visually understandable representation of predicted conditions, and may assist some drivers in deciding which route or departure time to select.

Image 601 shows a representation of the preferred route 615 and includes any identified likely areas of high traffic 617. The image also includes at least one alternative route 617, along with indicia of time difference 619 and high traffic areas 621. Thus, the driver can easily see areas of predicted traffic along a preferred route and alternative routes. Weather and other travel-time affecting data can also be displayed visually if desired. In one example, the driver can engage/disengage different filters to view different data on each map representation.

The display also includes a confirmation button 605, which allows the driver to confirm the selected route and time without any changes. If the driver desires to change a route or time, the driver can click the change time button 607 and/or select the alternative route displayed on the device.

The display includes informational data that shows the current departure time 609 represented by the graphic, as well as an expected travel time 611 and an expected arrival time 613. A slider 623 allows the driver to move forward or backward in time using the displayed arrows 625, and in this example an enlarged circle 627 shows "when" the driver is viewing within the viewable choices 629. In this instance, there is one window of time viewable earlier than the current display, and four windows of time viewable later than the current display. For informational use, the display also includes a battery life or fuel representation 631, along with a translation of the fuel data into a percentage 633 and the equivalent possible travel based on the remaining fuel 635.

The second image shows a next window-in-time with a departure 641 at 5:15 PM. As can be seen from FIG. 6, as time moves forward the high traffic area 647 on the previously suggested route 615 has greatly expanded. This results in increased travel time 643 and a much later arrival time 645. The alternative route is now shown as being 10 minutes faster 649, if departure is expected at 5:15 PM, with the previous high traffic area 621 being gone entirely. The displayed enlarged circle has moved one position to the left 653, to visually represent the forward progression in time.

In this example, the display also includes several alerts 651 that may serve to highlight particularly relevant information. Specifically, the alerts indicate that a better route exits and that an alternative departure time is recommended. These alerts could also be selectable in nature, so that clicking an alert would result in taking an action associated with the alert (e.g., in this instance, selecting a new route or selecting a new departure time). Through this and similar visual representations, it can be easy for a driver to see the projected differences in traffic and travel time and adjust plans accordingly. If the display is interactive, the driver can also quickly and easily make changes to a route or departure time.

Figure 7:
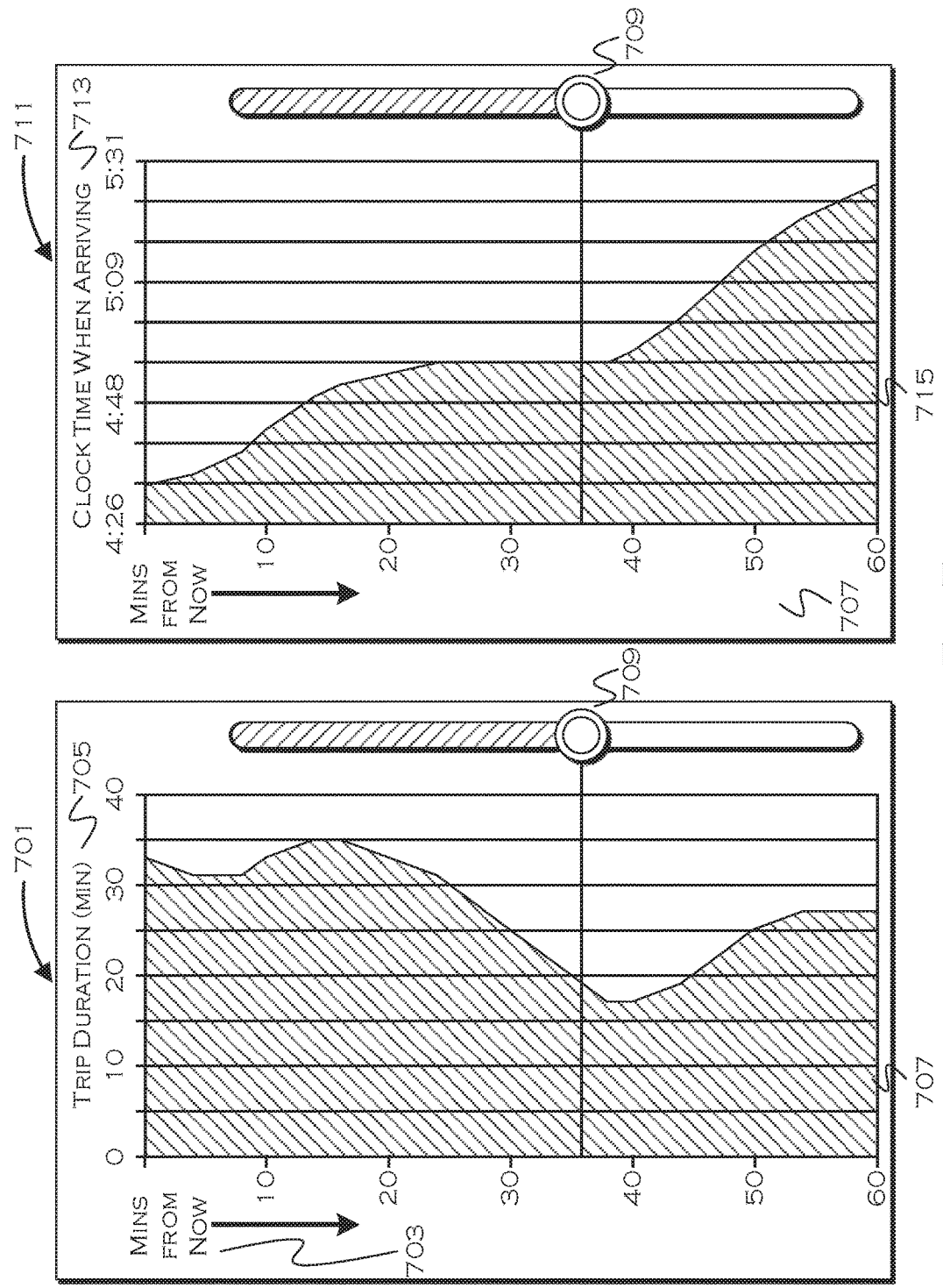
FIG. 7 illustrates an illustrative user-adjustable graph of travel time vs. departure time.

FIG. 7 illustrates an representation of a user-adjustable graph of travel time vs. departure time. This is an illustrative example that demonstrates how a user can view a variety of departure time possibilities, and the projected effects of each departure time on travel and/or arrival time. The data displayed on this graph could be calculated by the vehicle or cloud as described herein, and could be transmitted to a user device for display.

Graph 701 shows an illustrative example of a graph that shows various projected trip durations 705 (travel times) based on various upcoming departure times 703. In this example, the departure times are forward looking from the immediately present time, but the "start" time (at 0 minutes)

could also correspond to a requested departure time, and the graph could look ahead of and after that time as well. So, for example, if the user requested departure at 4 PM, and the current time was 2 PM, the start time might be 4 PM and the graph could show projected departure effects for 30 minutes before and 30 minutes after 4 PM.

The area under the graph 707 shows an easy to understand visual for the user to process quickly. Generally, for example, it can be seen that the traffic or other factors that affect travel time tend to diminish 20 minutes from now, and begin to re-establish shortly after that. Thus, the user can quickly see that sometime around 20 minutes from now is probably the most advisable time to leave.

A slider 709 could also be included, wherein if the slider is slid to a particular point, values for exact departure time (e.g., 21 minutes from now) and projected travel time (e.g. 29 minutes) could be displayed. The slider could also allow scrolling across a larger set of values than could be shown on a graph on a single screen display.

The other graph shows arrival time vs departure time 711. The values shown by this graph are those of projected arrival times 713 for given departure times 707. As with the other graph, a slider 709 can be included that allows for pinpointing a particular departure time and resulting arrival time. Again, the graph area 715 shows a quick visual guide for analyzing good departure times. Thus, for example, if a user knew that the user needed to be home by, for example, 6:00 PM, the user could leave at any time shown projected to get the user home before 6 PM.

Through application of the illustrative examples and the like, users can experience improved travel times and arrival times and avoid unexpected traffic and delays. With a quick glance at data and a few screen selections, a user can update a route or travel time and have the vehicle monitor the new route and time for predicted delays. This can continue up until departure, with minimal impact on the user's time and resources.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor programmed to:
send first and second recommended routes to a wireless device in response receiving a present vehicle location stored when a vehicle was parked, and a received destination and departure time, the first recommended route based on travel-time factors corresponding to the destination and departure time and specified routing and timing preferences, and the second recommended route based on a calculated alternative departure time using the specified preferences.

2. The system of claim 1, wherein the travel-time factors include weather.

3. The system of claim 2, wherein the processor is configured to access a weather report to obtain weather predictions for the received departure time and the alternative departure time.

4. The system of claim 1, wherein the travel-time factors include traffic.

5. The system of claim 4, wherein the processor is configured to access a traffic database including historic traffic conditions to predict traffic conditions at the received departure time and the calculated alternative departure time.

6. The system of claim 1, wherein the processor is located in a vehicle and is configured to send the first and second recommended routes even if the vehicle is not otherwise powered up.

7. The system of claim 1, wherein the processor is located remotely from the vehicle and wherein the processor receives the destination and departure time from the vehicle.

8. The system of claim 1, wherein the processor is further configured to receive a preferred route and/or the departure time from the wireless device.

9. The system of claim 8, wherein the processor is configured to send an arrival time or travel time to the wireless device for the preferred route using the received departure time and the travel-time factors.

10. The system of claim 9, wherein the processor is configured to repeatedly calculate the travel time based on the received departure time and most recently received travel-time factors at predefined intervals after sending the first and second recommended routes.

11. The system of claim 10 wherein, the processor is configured to:
in response to the travel time increasing by more than a threshold, calculate a new alternative departure time and a third recommended route based on the specified preferences; and
send the new alternative departure time and the third route to the wireless device.

12. The system of claim 1, wherein the specified preferences designate a shortest distance.

13. The system of claim 1, wherein the specified preferences designate a shortest travel time.

14. The system of claim 1, wherein the specified preferences designate a least fuel-consuming route.

15. A computer-implemented method comprising:
responsive to definition of a destination and a preferred departure time, and at predefined time intervals between a present time and the preferred departure time, calculating a projected travel time for a driver-selected route to the destination; and
responsive to the calculated projected travel time increasing by more than a predetermined threshold over an initial projected travel time, recommending an alternative departure time, calculated to result in a shorter travel time to the destination.

16. The method of claim 15, wherein the projected travel time and shorter travel time are calculated based on travel-time factors.

17. The method of claim 16, wherein the travel-time factors include a projected effect of present traffic conditions on travel time at the preferred departure time and the alternative departure time.

18. The method of claim 16, wherein the travel-time factors include projected traffic conditions at the preferred departure time and the alternative departure time, based on historic traffic conditions.

19. The method of claim 16, wherein the travel-time affecting environmental factors include an effect of projected weather conditions on travel time at the preferred departure time and the alternative departure time.

20. A system comprising:

a processor configured to:

wirelessly receive, from a vehicle, a plurality of recommended departure times and corresponding projected travel times to a destination confirmed by a user;

display the recommended departure times and corresponding projected travel times in a user-selectable manner;

receive selection of a recommended departure time as a preferred departure time; and transmit the selected recommended departure time to the vehicle.

* * * * *